United States Patent
Maalismaa et al.

(10) Patent No.: US 6,892,076 B2
(45) Date of Patent: May 10, 2005

(54) DIGITAL VIDEO BROADCAST-TERRESTRIAL (DVB-T) RECEIVER INTEROPERABLE WITH A GSM TRANSMITTER IN A NON-INTERFERING MANNER USING CLASSMARK CHANGE PROCEDURE

(75) Inventors: Juha Maalismaa, Kempele (FI); Marko Leinonen, Oulu (FI)

(73) Assignee: Nokia Corporation, Espoo (FI)

( * ) Notice: Subject to any disclaimer, the term of this patent is extended or adjusted under 35 U.S.C. 154(b) by 472 days.

(21) Appl. No.: 10/164,176

(22) Filed: Jun. 5, 2002

(65) Prior Publication Data

US 2003/0228892 A1 Dec. 11, 2003

(51) Int. Cl.[7] .......................... H04Q 7/20; H04B 1/00; H04M 1/00
(52) U.S. Cl. ............................. 455/552.1; 455/553.1; 455/450; 455/451; 455/452.1; 455/423; 455/61; 455/63.1; 455/550.1; 455/63.3
(58) Field of Search .......................... 455/63.1, 63.3, 455/114.2, 95, 113, 553.1, 423–425, 448, 450–451, 452.1, 454–455, 456.6, 457, 550.1, 552.1; 725/62–64, 105, 118, 123, 133, 141, 153

(56) References Cited

U.S. PATENT DOCUMENTS

| | | | | |
|---|---|---|---|---|
| 5,564,076 A | * | 10/1996 | Auvray | 455/76 |
| 6,101,228 A | * | 8/2000 | Hebron et al. | 375/346 |
| 6,522,865 B1 | * | 2/2003 | Otten | 455/13.1 |
| 6,539,068 B2 | * | 3/2003 | Hebron et al. | 375/346 |
| 6,700,882 B1 | * | 3/2004 | Lindoff et al. | 370/337 |
| 2002/0154059 A1 | * | 10/2002 | Lindenmeier et al. | 342/374 |
| 2002/0183013 A1 | * | 12/2002 | Auckland et al. | 455/73 |

FOREIGN PATENT DOCUMENTS

| | | |
|---|---|---|
| WO | WO 01/39576 A1 * | 6/2001 |
| WO | WO-01/39576 A1 | 6/2002 |

OTHER PUBLICATIONS

C. Hamacher, "Spectral Coexistence of DVB–T and UMTS in a Hybrid Radio System".*

(Continued)

*Primary Examiner*—William Trost
*Assistant Examiner*—Meless Zewdu
(74) *Attorney, Agent, or Firm*—Harrington & Smith, LLP

(57) ABSTRACT

A method and a device used for displaying wideband information to a user has a return channel made through a cellular mobile terminal (CMT) providing interactivity. The device (10) has a first antenna (12) and a second antenna (20), a receiver (14, 16) that is coupled to the first antenna and a transmitter (24) that is coupled to the second antenna. The method includes, prior to receiving information in a symbol-wise manner with the receiver in a first band of radio frequencies, generating a notification of reception with the receiver by asserting a DVB_RX_ON signal (16A) and, in response to the notification, requesting a change of transmitter transmission frequencies from a second band of radio frequencies to a third band of radio frequencies that is predetermined to avoid interference with the reception of the information in the first band of radio frequencies. The transmitter is preferably a cellular mobile terminal transmitter, and the request for a change can be made by initiating a Classmark Change procedure with a cellular mobile terminal wireless network. In one embodiment the first band of radio frequencies comprises a DVB-T 470–862 MHz reception band, the second band of radio frequencies comprises a GSM 880–915 MHz transmission band, and the third band of radio frequencies comprises a higher GSM band, such as the GSM 1800 MHz band or the European 3G band. In other embodiments, such as one practiced in the United States, the CMT call may be rerouted from the CMT 800 MHz band to the CMT 1900 MHz band.

16 Claims, 6 Drawing Sheets

OTHER PUBLICATIONS

J. Huschke et al., "Guard Band Coordination of Areas with different Spectrum Allocation".*

Public Safety PSWN Program Wireless Network "Public Safety Radio Frequency Spectrum Digital Television Transition Status Update" Jan. 2002 pp 1–14.

J.H. Scott "The How and Why of COFDM", Tutorial–COFDM, EBU Technical Review—Winter 1998, pp1–14.

Magnus Eriksson, "Evaluation of Packet–by–Packet Downlink Radio Resource Management Schemes", VTC'01, Rhodes, Greece, Jun. 6–9, 2001.

C. Hamacher "Spectral Coexistence of DVB–T and UMTS in a Hybrid Radio System".

J. Huschke et al., "Guard Band Coordination of Areas with Differing Spectrum Allocation".

Magnus Eriksson, "Dynamic Single Frequency Networks", IEEE Journal on Selected Areas in Communications, vol. 19, No. 10, Oct. 2001 pp. 1905–1914.

Nokia Connecting People, "Future Technology STC", Copyright© Nokia Multimedia Terminals Oy 2000.

Junko Yoshida, "Nokia Redefines Digital TV as a Mobile Device" pp. 1–4, EE Times Apr. 22, 2002.

"Digital Video Broadcasting (DVB); Framing Structure, channel coding and modulation for digital terrestrial television." Draft EN 300 744 v1.2.1 (Jan. 1999) European Standard, Telecommunications Series. European Broadcasting Union.

* cited by examiner

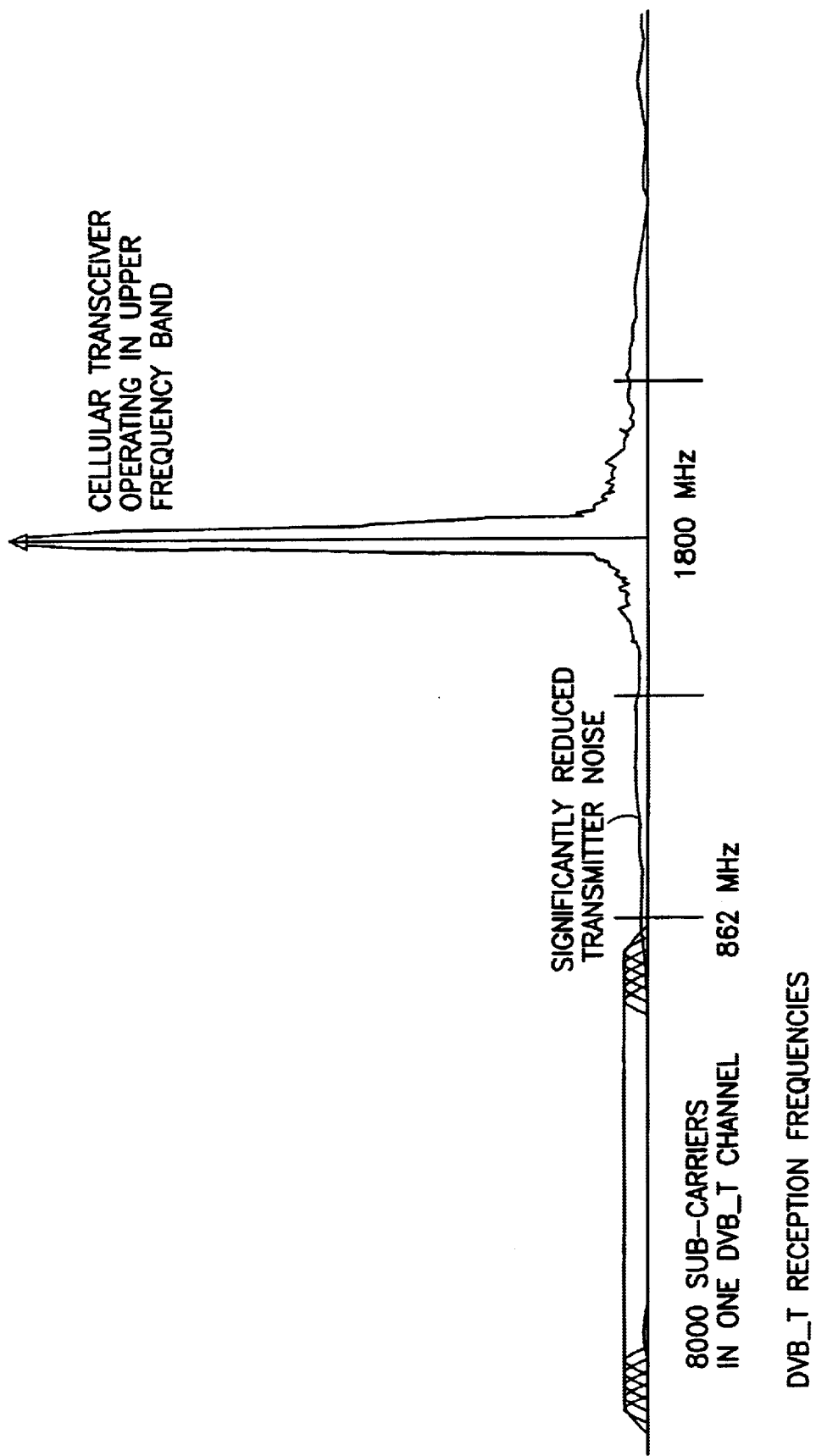

DIGITAL VIDEO BROADCAST-TERRESTRIAL (DVB-T) RECEIVER INTEROPERABLE WITH A GSM TRANSMITTER IN A NON-INTERFERING MANNER USING CLASSMARK CHANGE PROCEDURE

TECHNICAL FIELD

These teachings relate generally to methods and apparatus for operating a digital video/data receiver in close proximity to a potentially interfering transmitter and, more specifically, relate to methods and apparatus for operating a DVB-T receiver in close proximity to a cellular telephone transmitter, which could be a Time Division Multiple Access (TDMA) Global System for Mobile Communication (GSM) transmitter, such as one used to provide a return channel to a source of data that is received through the DVB-T receiver.

BACKGROUND

DVB-T was first adopted as a standard in 1997, and is currently rapidly expanding in Europe, Australia and Asia. DVB-T offers about 24 Mb/s data transfer capability to a fixed receiver, and about 12 Mb/s to a mobile receiver using an omnidirectional antenna. Some distinguishing technical features of DVB-T include the following: DVB-T offers a net bit rate (R) per frequency channel in the range of about 4.98 to 31.67 Mbit/s and operates with a channel separation of 8 MHz in the UHF range of 470–862 MHz(in the VHF 174–216 MHz range the channel separation is 7 MHz). Single frequency networks can be used. DVB-T uses a Coded Orthogonal Frequency Division Multiplex (COFDM) multi-carrier technique with QAM, 16QAM or 64QAM carrier modulation. The number of sub-carriers can be between 1705 (2 k) to 6817 (8 k). Inner forward error correction coding (FEC) uses convolutional coding with rates ½, ⅔, ¾, ⅝ or ⅞, while an outer coding scheme uses Reed-Solomon (204,188,t-8) coding. Outer bit-interleaving uses convolutional interleaving of depth 0.6–3.5 msec.

While DVB-T was developed for MPEG-2 Transport stream distribution, it is capable of carrying other types of (non-video) data. For example, DVB-T can provide a broadband, mobile wireless data transport for video, audio, data and Internet Protocol (IP) data. DVB-T is scalable, with cells sizes ranging from, for example, 100 km down to picocells (e.g. tens to hundreds of meters). The capacity is very large, e.g, 54 channels can be supported, each running at 5–32 Mbit/s. One TS-packet is 188 (204) bytes long.

Due to the large number of sub-carriers the symbol time can be made very long. For example, for the 8 k sub-carrier case the symbol time is on the order of 1 millisecond. A guard interval is inserted before each symbol.

Thus, it can be realized that while well suited for providing digital video streams, DVB-T can be used to provide high speed data streams for other types of applications, such as interactive services, Internet access, gaming and e-commerce services. As can be appreciated, for interactive and other services to be provided a return link or channel is required from the user back to some server or other controller. One example of such as a system is known as MediaScreen™ that was shown by the assignee of this patent application. This device provides a LCD display screen for displaying information received from a DVB-T downlink, and includes a GSM function having a transmitter to provide the return link or channel.

In WO 01/39576, "Charging in Telecommunication System Offering Broadcast Services", published 7 Jun. 2001, Risto Mäkipää and Jorma Havia (Alma Media Oyj) describe a system having a terminal and a broadcast network offering broadcast services. The terminal selects the information to be broadcast by means of a reverse connection made through, for example, a third generation mobile system, embodied as a Universal Mobile Telecommunications System (UMTS) network.

A problem that may be created by the transmission of the DVB-T signal is interference into the UMTS receive band (beginning at about 826 MHz). This problem was recognized and discussed by C. Hamacher "Spectral Coexistence of DVB-T and UMTS in a Hybrid Radio System", ComNets, and the use of a guard band (GB) is discussed. FIG. 1 of this patent application is based on FIG. 1 of Hamacher, and shows an adjacent channel interference (ACI) scenario, with transmitter masks defined by the relevant DVB-T and UMTS standards, and the receiver filters assumed to be ideal. In Section VI (Conclusions and Future Work) the author states that comparable studies with DVB as a victim system would be performed.

In an article entitled "Evaluation of Packet-by-Packet Downlink Radio Resource Management Schemes", in VTC'01, Rhodes, Greece, Jun. 6–9, 2001, and in an article entitled "Dynamic Single Frequency Networks", IEEE Journal on Selected Areas in Communications, Vol. 19, No. 10, Oct. 2001, pgs. 1905–1914, Magnus Eriksson discusses asymmetric Internet access using a DVB-T downlink with a cellular system, i.e., GSM, as the narrowband uplink. These articles discuss the use of dynamic radio resource management (RRM) techniques, such as dynamic channel allocation (DCA), link adaptation and traffic adaptive handover to improve spectral efficiency.

The inventors have realized that a potential exists for a problem in the DVB-T receiver when an associated return channel cellular system (e.g., GSM) transmitter is operational, especially in the case where there is only a small physical separation between the two antennas (i.e., the two antennas are operating in the near field, and antenna radiation pattern filtering cannot be employed in the receiver filtering arrangement.) Furthermore, this problem is not limited to the use of GSM for the return channel, but can occur as well should a GSM voice call or a data call be made when DVB-T reception is ongoing. For example, the user might perform a digital packet access via a GSM/EDGE network to an e-mail server or a similar packet protocol system. Furthermore, a WAP communication can be made during DVB-T reception to view a schedule of television programming that is available from a WAP/WEB server.

The problem arises because the lower end of the GSM transmission band begins at 880 MHz, while the upper end of the received DVB-T frequency band ends at 862 MHz. Thus, transmitted energy from the GSM band can leak into the DVB-T receiver, resulting in errors in the received data. This is shown graphically in FIG. 2. The point labeled as A designates the GSM 900 MHz –23 dBm receiver blocking level used for an in-band blocking measurement. The spurious in-band blocking specification to one tone is –23 dBm at 3 MHz, and –31 dBm at 6 MHz. If one assumes that the GSM900 average transmitted power is +33 dBm, with reference to FIG. 3, and assumes a reasonable 6 dB of antenna isolation from the GSM antenna 20 to the DVB-T antenna 12 (an exact figure is difficult to discern, as the antennas are assumed to be in the near field, and antenna pattern filtering is not usable), then the power seen at the input to the DVB-T receiver 14 is +27 dBm, which is more than 30 dB greater in spurious signal level than in the GSM receiver 22. In FIG. 2 the delta (Δ) indicates the more strenuous (50 DB) difference in the required DVB-T blocking requirement. The DVB-T receiver sees significant GSM transmitter noise in the 8 k sub-carrier band at the upper (862 MHz) end of the DVB-T spectrum. This is an undesirable situation, as errors can be experienced in the DVB-T reception when the GSM transmitter is active.

While at first glance it may seem that one could simply implement a highly linear DVB-T receiver, in practice this is difficult to achieve in a cost effective and a low power consumption manner, both of which are important considerations when building portable, battery powered consumer devices. If the GSM transmission from the lowest GSM transmit channel were to be adequately filtered from the DVB-T receiver when operating at the highest channel, a very steep filter would be required. The steepness of the required filter implies that the insertion loss at the passband of the DVB-T receiver is increased, and thus the sensitivity of the receiver would be reduced.

It should be noted that while the foregoing discussion has concentrated on specific DVB-T frequencies and the European GSM system, the same problems can arise in other locations where Digital Television has been specified for use. For example, in the United States of America digital television is referred to as ATSC (Advanced Television Systems Committee), and the FCC has allocated the frequency bands of 764–776 MHz and 794–806 MHZ for Digital Television (DTV) broadcasts. One U.S. cellular transmission band (already occupied) has been established from 824–849 MHz. As can be noted, the upper boundary of the DTV band (806 MHz) is separated from the lower end of the cellular transmit band by only 18 MHz, about the same separation that is seen in the DVB-T/GSM embodiment described above.

SUMMARY OF THE PREFERRED EMBODIMENTS

The foregoing and other problems are overcome, and other advantages are realized, in accordance with the presently preferred embodiments of these teachings.

A method and a device that are used for displaying wideband information to a user has a return channel made through a cellular mobile terminal (CMT) providing interactivity. The device has a first antenna and a second antenna, a receiver that is coupled to the first antenna and a transmitter that is coupled to the second antenna. The method includes, prior to receiving information in a symbol-wise manner with the reciever in a first band of radio frequencies, generating a notification of reception with the receiver by asserting a DVB_RX_ON signal and, in response to the notification, requesting a change of transmitter transmission frequencies from a second band of radio frequencies to a third band or radio frequencies that is predetermined to avoid interference with the reception of the information in the first band of radio frequencies. The transmitter is preferably a cellular mobile terminal transmitter, and the request for a change can be made by initiating a Classmark change procedure with a cellular mobile terminal wireless network. In the preferred embodiment, the first band of radio frequencies comprises a DVB-T 470–862 MHz reception band, the second band of radio frequencies comprises a GSM 880–915 MHz transmission band, and the third band of radio frequencies comprises a higher GSM band, such as the GSM1800 MHz band or the European third generation (3G) band (UMTS, WCDMA) 1920–1980, 2110–2170 MHz band. In other embodiments, such as one practiced in the United States, the CMT call may be rerouted from the CMT 800 MHz band to the CMT 1900 MHz band.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2B is a graph that illustrates the benefit gained by the use of this invention, where the GSM cellular mobile terminal is switched from the GSM 900 MHz band to a higher band, such as the GSM 1800 MHz band or the 3G WCDMA band, or from the GSM 800 MHz band to the GSM 1900 MHz band, thereby widely separating the GSM transmitted return channel frequency from the DVB-T reception frequency and substantially reducing interference into the received DVB-T symbol stream;

DETAILED DESCRIPTION OF THE PREFERRED EMBODIMENTS

Figure 3:
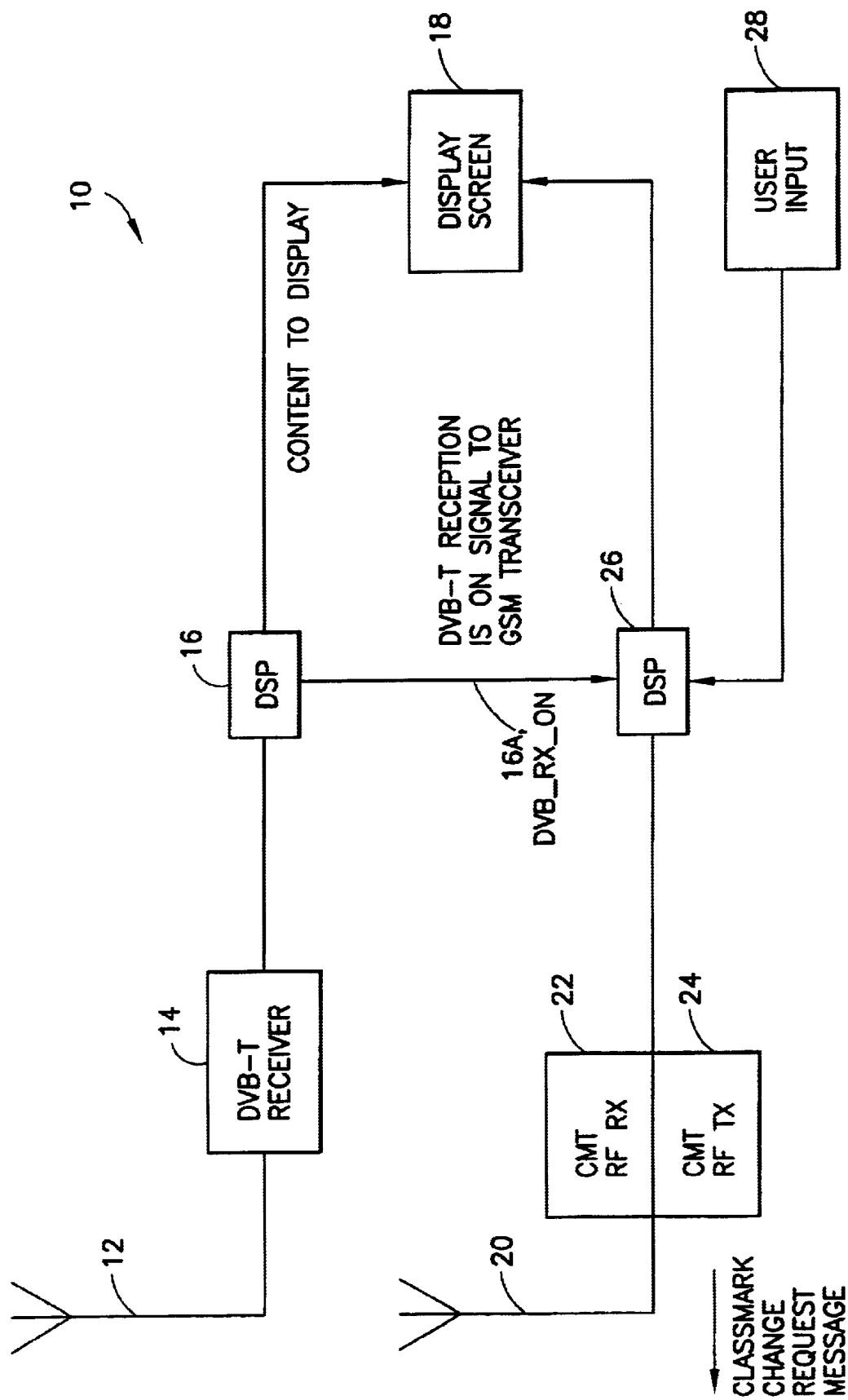
FIG. 3 is a block diagram of a DVB-T/cellular mobile terminal (CMT) enabled device constructed in accordance with this invention to provide a notification from the DVB-T part to the CMT part of the start of DVB-T reception, enabling the CMT part to request assignment to a different, non-interfering transmission band.

FIG. 3 is a block diagram of an embodiment of a portable device 10 that includes a DVB-T antenna 12, a DVB-T receiver 14, an associated DVB-T signal processor, such as a DVB-T digital signal processor (DSP) 16 and a display 18 for displaying to a user data, such as video or Internet data, that is received from a DVB-T transmitter (not shown). The device 10 also includes a cellular mobile terminal (CMT) that includes a CMT antenna 20, a CMT RF receiver (RX) 22, a CMT RF transmitter (TX) 24 and a CMT DSP 26. The CMT DSP 26 may also be coupled to the display 18 for displaying information received from a remote CMT transmitter (not shown), or a voice communication can be routed to a headset or speaker. In the presently preferred, but non-limiting example, the DVB-T system operates in the UHF range of 470–862 MHz, and the CMT system is a multi-band GSM system capable of operation in at least two frequency bands, most typically the GSM900 MHz band and the GSM 1800 MHz band (1710–1880 MHz). In operation in the U.S. the GSM 800 MHz cellular band is 824–849 MHz (TX) and 869–894 MHz (RX), and the GSM 1900 MHz cellular band is 1850–1910 MHz (TX) and 1930–1990 MHz (RX), while the U.S. digital television (ACTS) highest frequency is 806 MHz.

Figure 2A:
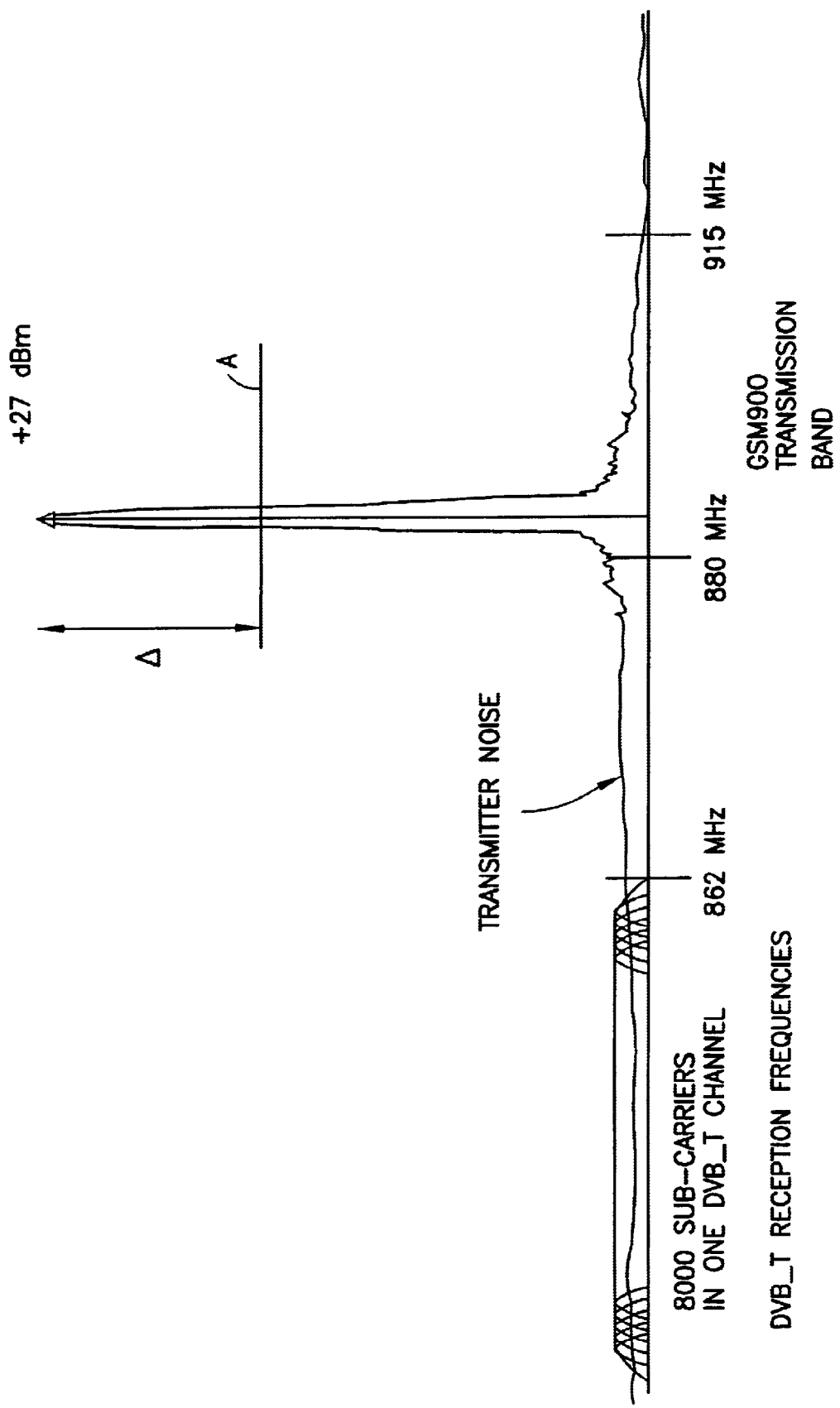
FIG. 2A is a graph that is useful in understanding the problem that is solved by this invention, where co-located GSM and DVB-T antennas result in GSM 900 MHz burst energy leaking into the DVB-T receiver.

For the illustrated example, when operating as a GSM900 MHz system the lower end of the transmitter spectrum is at 880 MHz (see FIG. 2A), while when operating as a GSM1800 MHz system the lower end of the transmitter spectrum is separated by a significantly larger amount from the upper end of the DVB-T reception band (see FIG. 2B).

Note that the device 10 will typically include some type of user input device 28, such as a keypad, keyboard, mouse, or mouse emulator that provides the interactivity required for the applications of most interest to this invention. For example, if IP data is being delivered through the DVB-T receiver 14, 16 to the display screen 18, and a web page is displayed, the user may interact with the web page in a conventional manner by typing in information, or pointing and clicking with a mouse or similar pointing device that comprises the user input 28. This relatively low bandwidth user input data is eventually coupled into the CMT DSP 26 (through suitable user interface I/O circuitry, as is well known) where it is formatted into a data stream that is transmitted in a burst-wise fashion, using the CMT transmitter 24 and the CMT antenna 20, back to some server or other controller that is typically also the source of the DVB-T data stream. It is these CMT transmissions, due at least in part to the fact that the CMT antenna 20 is essentially co-located with the DVB-T antenna 12, that results in DVB-T reception errors.

Note that a data stream can also be received through CMT receiver 22, such as packet acknowledgment messages and supervisory information. Some of the CMT-received data may also be displayed to the user on the display screen 18.

It should further be noted that circuitry may be provided, such as a microphone and speaker, for enabling normal voice calls to be made using the CMT.

When the GSM900 transmitter 24 is on at fall power, the 577 microsecond long GSM burst is transmitted with +33 dBm power. If at the same time the DVB-T receiver 14 is attempting to receive (assuming that the antenna 12 is physically close to the antenna 20), then the linearity requirement of the receiver 14 becomes very demanding. If the DVB-T receiver 14 is optimized for this environment then it will consume excessive power in the normal operational mode when the GSM transmitter 24 is not on and the GSM carrier is not present.

If the GSM900 band were to be filtered out of the DVB-T receiver 14 approximately 50 dB of filtering would be required with a 20 MHz transition. While this is comparable to what is required in the PCS1900 MHz CDMA or WCDMA band, the operation frequency (about 900 MHz) is only about one half, making the implementation even more difficult. Furthermore, about 4 dB of insertion loss is experienced when filtering in the PCS1900 MHz band, implying that even greater insertion loss would be experienced if it were attempted to filter out the GSM900 MHz band from the DVB-T receiver 14.

In accordance with an aspect of this invention the foregoing problems are solved by providing a signal line (DVB_RX_ON) 16A from the DVB-T DSP 16 to the CMT DSP 26. The signal line DVB_RX_ON 16A, when asserted by the DVB DSP 16, means that a DVB-T symbol stream is about to be received, or is expected to be received (e.g., the user has enabled the DVB-T mode, or the user has turned on the DVB-T receiver 14), and the DVB_RX_ON signal line 16A preferably remains asserted during reception.

Figure 5:
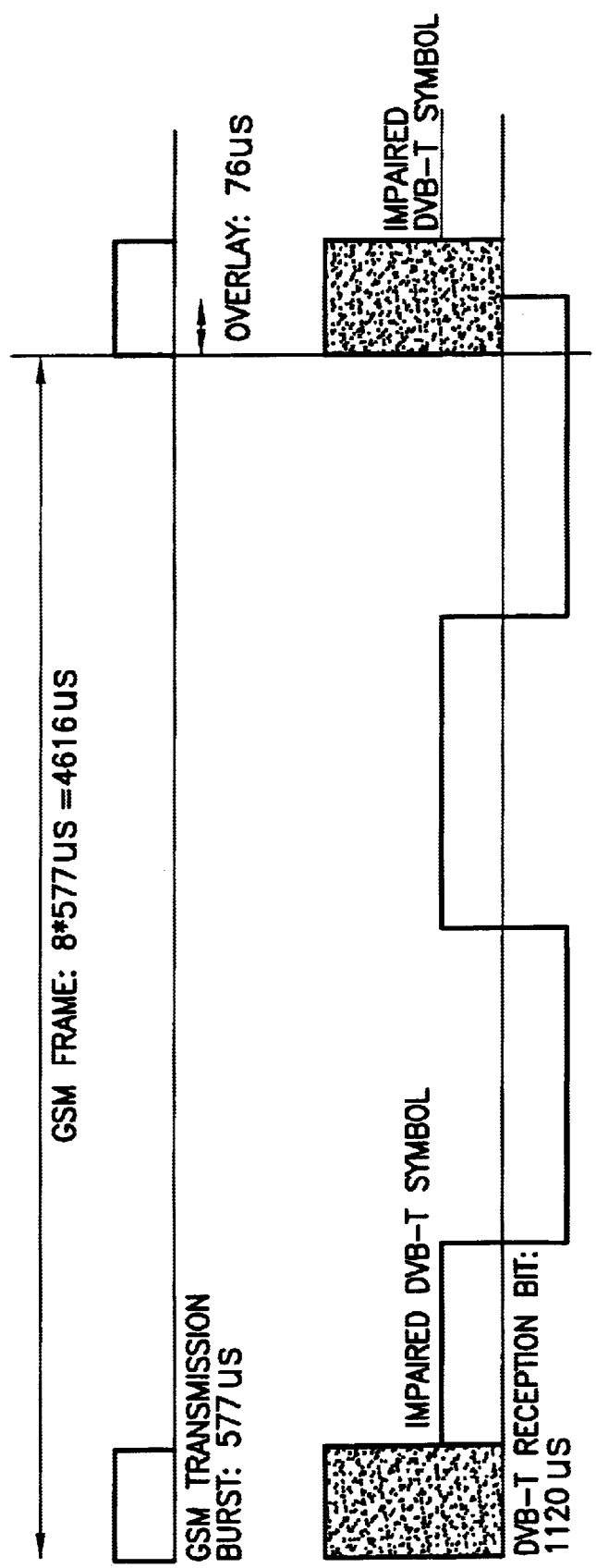
FIG. 5 is a waveform diagram that is useful in explaining the adverse effect on the received DVB-T symbol stream by the presence of GSM900 transmitted bursts.

One received DVB-T symbol can have a duration of 1120 microseconds, about twice the duration of the GSM burst, as can be seen in FIG. 5. Note in FIG. 5 that the GSM900 MHz burst overlays the DVB-T reception symbols and, because the GSM900 MHz burst is not synchronized to the DVB-T symbol stream, slides over the DVB-T symbol stream so that no two time-wise adjacent DVB-T symbols are impaired by the same amount.

Figure 1:
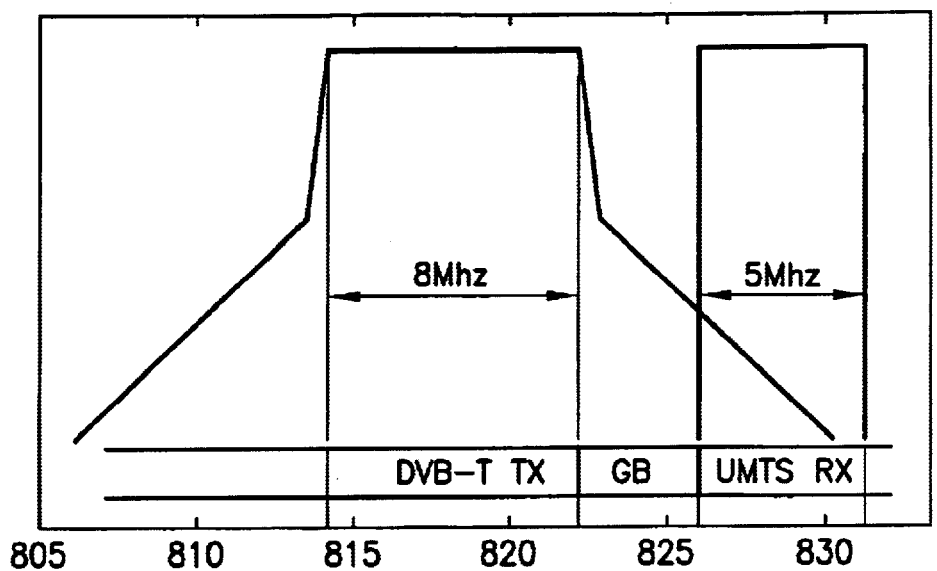
FIG. 1 is a graph taken from the prior art that shows an adjacent channel interference (ACI) scenario with interference from the DVB-T transmission band into the UMTS receive band.
Figure 4A:
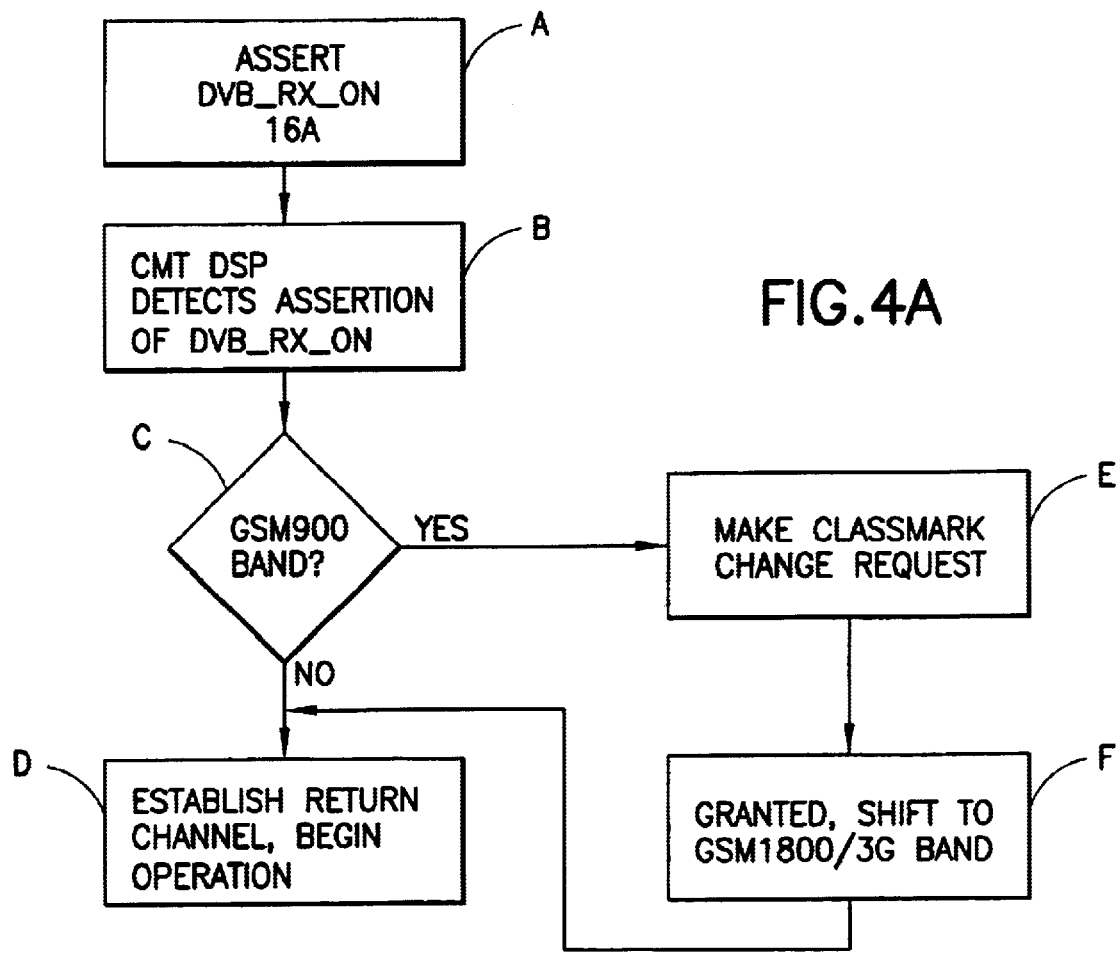
FIG. 4A is a logic flow diagram that illustrates a method in accordance with this invention.

Referring to the logic flow diagram of FIG. 4A, in accordance with this invention the situation of FIG. 5 is avoided by a method that shifts the frequency of the GSM return channel transmissions away from the DVB-T reception band frequencies. However, these teachings are not related solely to return channel transmissions, but apply as well when a CMT call arrives (or is originated) during television reception, as the CMT transmitter 24 is used for signalling purposes. If the call is answered, then the CMT transmitter 24 will be active for the duration of the call. At Step A the DVB DSP 16 asserts the DVB_RX_ON signal line 16A to indicate the beginning of DVB-T reception. This can be done in response to the user turning on or otherwise enabling the DVB portion of the device 10. At Step B the CMT DSP 26 detects the assertion of the DVB_RX_ON signal line 16A and at Step C makes a determination of whether the CMT is operating in the GSM900 MHz band or in a higher band, such as the GSM1800 MHz or the 3G (e.g., WCDMA) bands. If the CMT is operating in the higher band then operation continues at Step D to establish, if not already done, the DVB-T return channel to the source of the DVB-T transmission, thereby providing the user with interactivity. That is, the return channel transmissions from the CMT transmitter 24 are sufficiently separated in frequency from the upper end of the DVB-T reception band so as to not pose a threat of interference into the DVB-T reception band. However, if at Step C the CMT DSP 26 determines that the CMT is operating in the GSM900 MHz band, then at Step E the DSP 26 formats a message to the CMT network for requesting operation in the higher band. This request can be made by initiating a Classmark Change procedure and by sending a Classmark Change message to the CMT network (see, for example, Section 3.4.10, Classmark Change procedure, 3G PPTS 04.18, V8.11.0 (2001–09)). This procedure enables the CMT to indicate to the wireless network a change of characteristics reflected in the Classmark information element. In this invention the change of characteristics is an indication of a request to move from the GSM900 MHz band to the higher band, either the GSM1800 MHz or the 3G band, depending on network type and availability. Step F assumes that the network responds with permission for the Classmark change, and the CMT DSP 26 makes the change to begin operation in the higher frequency, non-interfering transmission band. Control then passes to Step D to establish the DVB-T return channel to the source of the DVB-T transmission, thereby providing the user with interactivity. The result is operation as reflected in FIG. 2B for the GSM1800 MHz case.

Figure 4B:
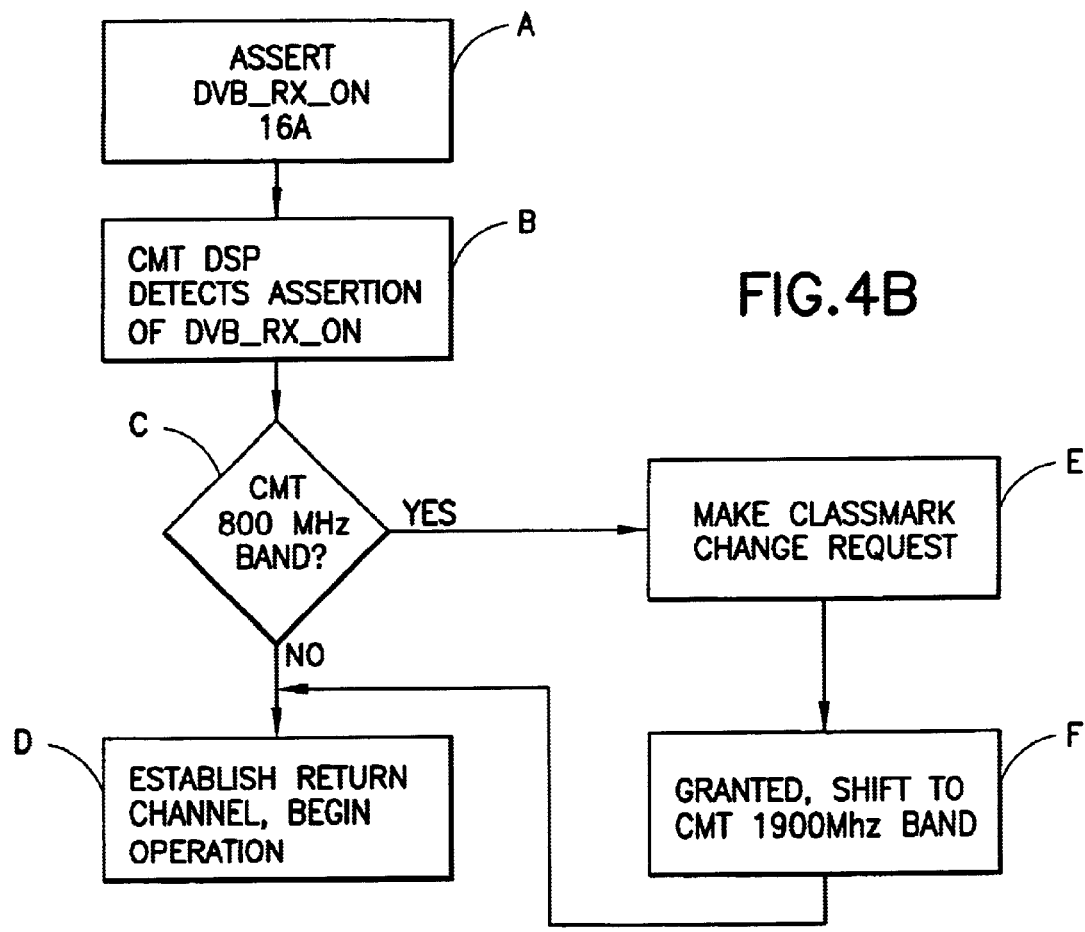
FIG. 4B is a logic flow diagram that illustrates a further method in accordance with this invention.

FIG. 4B is a logic flow diagram, similar to FIG. 4A, but for the U.S. CMT case. In Step C a determination is made if the CMT is operating in the CMT 800 MHz band or in a higher band, such as the CMT 1900 MHz band. If the CMT is operating in the higher band then operation continues at Step D to establish, if not already done, the DVB-T return channel to the source of the DVB-T transmission, thereby providing the user with interactivity. If at Step C the CMT DSP 26 determines that the CMT is operating in the CMT 800 MHz band, then at Step E the DSP 26 formats a message to the CMT network for requesting operation in the higher band. This request can be made by initiating a Classmark Change (or equivalent) procedure and by sending a Classmark Change (or equivalent) message to the CMT network Step F assumes that the network responds with permission for the Classmark change, and the CMT DSP 26 makes the change to begin operation in the higher frequency, non-interfering CMT 1900 MHz transmission band. Control then passes to Step D to establish the DVB-T return channel to the source of the DVB-T transmission, thereby providing the user with interactivity.

FIG. 2B is a graph that illustrates the benefit gained by the use of this invention, where the GSM CMT transmitter 24 is switched from the GSM900 MHz band to the higher GSM band, such as the GSM1800 MHz band, thereby widely separating the GSM transmitted return channel frequency from the DVB-T reception frequency and substantially reducing interference into the received DVB-T symbol stream.

If the network does not grant the Classmark Change request, the DSP 26 may signal the DVB DSP 16 to simply not receive the DVB-T transmission, thereby avoiding the possibility of receiving corrupted data. The user may be notified of this situation by a message displayed on the display screen 18.

However, if the network does not grant the Classmark Change request it is also within the scope of this invention to operate the device 10 in a manner disclosed in copending and commonly assigned U.S. patent application Ser. No. 10/164,177, filed on even date with this patent application, entitled "Digital Video Broadcast-Terrestrial (DVB-T) Receiver Interoperable with a GSM Transmitter in a Non-Interfering Manner", by Marko E. Leinonen and Veijo Korhonen; incorporated by reference herein in its entirety. In this case, the DVB-T DSP 16 is made aware of the occurrence of each GSM 900 MHz burst, by the assertion of a GSM_TX_ON signal line by the DSP 26, and it ignores that part of the received DVB-T bit that overlaps with the GSM900 MHz burst. A correct symbol determination can still be accomplished, however, since the symbol detection is performed by operating a DVB-T receiver integrator over the input signal form, and then comparing the integration result to a symbol detection threshold value. In many cases the symbol detection will be accurate if the signal to noise ratio (SNR) is adequate, even though the received DVB-T waveform is not integrated over the entire symbol time of 1120 microseconds. During the assertion of the GSM_TX_ON signal line certain unnecessary parts of the DVB receiver can be powered down or placed in a lower power consumption mode, thereby conserving battery power.

Note that it is also possible to simply ignore some or all impaired DVB-T symbols, and rely on the inherent error correction capability to attempt to supply the correct symbol. However, it is not possible to correct all symbols in this manner, and this approach is thus not preferred.

The teachings of this invention enable the request for Classmark Change by the CMT to be made after the start of DVB-T reception occurs, or prior to the start of DVB-T reception. In either case, therefore, there is a step of generating a notification of reception with the DVB-T receiver, i.e., the notification of reception can occur after the actual start of DVB-T reception (after the DVB-T receiver 14 is turned on or otherwise enabled for use) or prior to the actual start of DVB-T reception (before the DVB-T receiver 14 is turned on or otherwise enabled for use).

The invention has been described thus far in terms of specific examples of frequency bands and the like. However, it should be kept in mind, as was discussed previously, that these teachings can be applied to other frequency bands, such as the frequency bands of 764–776 MHz and 794–806 MHZ that are allocated in the U.S. for DTV broadcasts, and to the cellular 824–849 MHz (TX) and 869–894 MHz (RX) bands (e.g., the GSM 800 MHz band), as well as the cellular 1850–1910 MHz (TX) and 1930–1990 MHz (RX) bands (e.g., the GSM 1900 MHz band).

Thus, while described above in the context of presently preferred embodiments, it can be appreciated that certain changes in form and details may be made therein, and that the modified method and apparatus will still fall within the teachings of this invention. For example, those skilled in the art should realize that the assertion of the DVB_RX_ON signal may precede the actual reception of the DVB-T data to give the CMT time to request the Classmark Change from the network. Also, other techniques for shifting the CMT transmitter 24 to the higher frequency band can be used, and the invention is thus not limited to the use of only the Classmark Change procedure.

Also, while the above disclosure of the presently preferred embodiments has concentrated on the use of the DVB-T and GSM systems, those skilled in the art should realize that these should not be read as limitations on the practice of this invention, and that other types of communications systems using the same or different frequency bands may also benefit from the use of this invention.

Note as well that in some embodiments a single high performance DSP may be used for achieving the functionality of both the DSP 16 and the DSP 26. In this case the DVB_RX_ON signal may be simply an internal signal or even a flag set in a register or a memory location that software that implements the CMT functionality responds to in the manner described above. In this case one may still refer to two DSPs, but the distinction is then more of a logical than a physical one.

What is claimed is:

1. In a device comprising a first antenna and a second antenna, a method for operating a receiver coupled to the first antenna in combination with a transmitter coupled to the second antenna, comprising:
   generating, prior to receiving information with the receiver in a first band of radio frequencies, a notification of reception with the receiver; and
   in response to the generated notification, determining whether the transmitter is operating in a second band of radio frequencies or in a third band of radio frequencies, and if it is determined that the transmitter is operating in the second band of radio frequencies, requesting a change of transmitter transmission frequencies from the second band of radio frequencies to the third band of radio frequencies that is predetermined to avoid interference with the reception of the information in the first band of radio frequencies.

2. A method as in claim 1, where the transmitter is a cellular mobile terminal transmitter, and where the request for a change is made by initiating a Classmark Change procedure with a cellular mobile terminal wireless network.

3. A method as in claim 1, where the first band of radio frequencies comprises 470–862 MHz, where the second band of radio frequencies comprises 880–915 MHz, and where the third band of radio frequencies lies above 1700 MHz.

4. A method as in claim 1, where the first band of radio frequencies comprises a DVB-T 470–862MHz reception band, where the second band of radio frequencies comprises a GSM 880–915 MHz transmission band, and where the third band of radio frequencies comprises the GSM1800 MHz band.

5. A method as in claim 1, where the first band of radio frequencies comprises a DVB-T 470–862MHz reception band, where the second band of radio frequencies comprises a GSM 880–915 MHz transmission band, and where the third band of radio frequencies comprises the European 3G band.

6. A method as in claim 1, where the first band of radio frequencies comprises a 794–806 MHz reception band, where the second band of radio frequencies comprises a CMT 824–849 MHz transmission band, and where the third band of radio frequencies comprises the GSM1900 MHz band.

7. A device comprising a first antenna and a second antenna, a receiver coupled to said first antenna, a transmitter coupled to said second antenna, and a display device for displaying at least information that is received through said first antenna, said receiver receiving information in a first band of radio frequencies and comprising a first data processor for processing the received bits, said device further comprising a second data processor controlling transmission from said second antenna in a different band of radio frequencies, said first data processor generating a notification of reception with the receiver prior to receiving information in the first band of radio frequencies and said second data processor determining, in response, whether the transmitter is operating in a second band of radio frequencies or in a third band of radio frequencies, and if said second data processor determines that the transmitter is operating in the second band of radio frequencies, said second data processor transmitting a request to change transmitter transmission frequencies from the second band of radio frequencies to the third band of radio frequencies that is predetermined to avoid interference with the reception of the information in the first band of radio frequencies.

8. A device as in claim 7, where the transmitter is a cellular mobile terminal transmitter, and where the request for a change is made by initiating a Classmark Change procedure with a cellular mobile terminal wireless network.

9. A device as in claim 7, where the first band of radio frequencies comprises 470–862 MHz, and where the third band of radio frequencies lies above 1700 MHz.

10. A device as in claim 7, where the first band of radio frequencies comprises a DVB-T 470–862 MHz reception band, and where the transmitter requests a change from a GSM 880–915 MHz transmission band to the second band of radio frequencies that comprises the GSM1800 MHz band.

11. A device as in claim 7, where the first band of radio frequencies comprises a DVB-T 470–862 MHz reception band, and where the transmitter requests a change from a GSM 880–915 MHz transmission band to the second band of radio frequencies that comprises the European 3G band.

12. A device as in claim 7, where the first band of radio frequencies comprises a 794–806 MHz reception band, where the second band of radio frequencies comprises a CMT 824–849 MHz transmission band, and where the third band of radio frequencies comprises the GSM 1900 MHz band.

13. A portable, battery powered device comprising a display screen for displaying information received through a first antenna by a receiver operating in a DVB-T 470–862 MHz reception band; and also comprising a multi-band GSM transmitter, said device further comprising means for generating a notification of reception with the receiver prior to receiving information and means, responsive to the notification when operating in a GSM900 MHz band, for requesting a change of transmitter transmission frequencies from the GSM900 MHz band to one of a GSM1800 MHz band or a European 3G band to avoid interference with the reception of the information in the DVB-T 470–862 MHz reception band.

14. A device as in claim 13, where the request for a change of transmitter transmission frequencies is made by initiating a Classmark Change procedure with a GSM wireless network.

15. A portable, battery powered device comprising a display screen for displaying information received through a first antenna by a receiver operating in a digital television reception band that extends to 806 MHz, and also comprising a multi-band CMT transmitter, said device further comprising means for generating a notification of reception with the receiver prior to receiving information and means, responsive to the notification when operating in a CMT 800 MHz band, for requesting a change of transmitter transmission frequencies from the CMT 800 MHz band to a CMT 1900 MHz band to avoid interference with the reception of the information in the digital television reception band.

16. A device as in claim 15, where the request for a change of transmitter transmission frequencies is made by initiating a Classmark Change procedure with a CMT wireless network.

* * * * *